J. J. McINTYRE.
TOOL HOLDER.
APPLICATION FILED MAR. 31, 1909.
958,936.
Patented May 24, 1910.
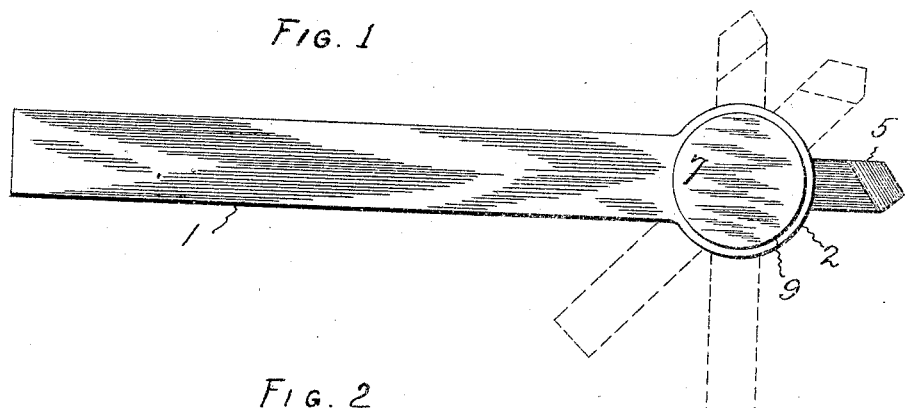
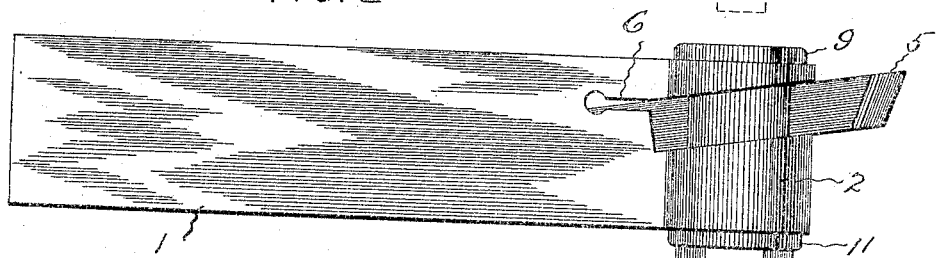
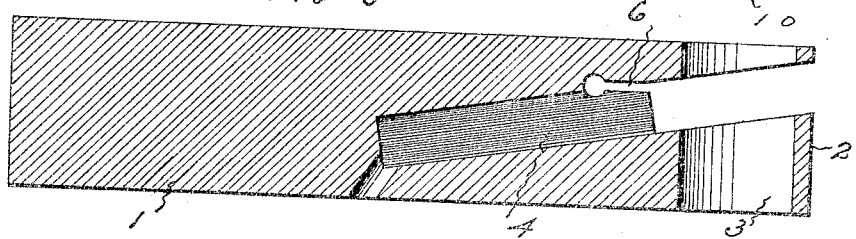
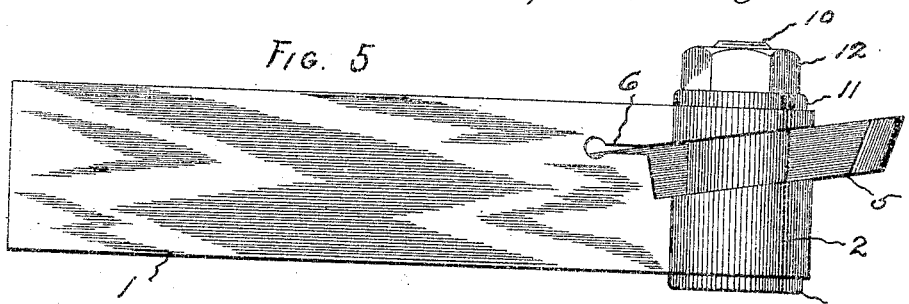
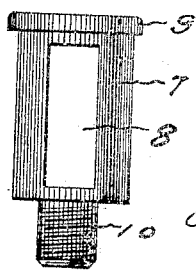
WITNESSES:
Howard L. Holcomb
Josephine M. Strempfer
INVENTOR:
John J. McIntyre
Harry R. Williams
atty.

UNITED STATES PATENT OFFICE.

JOHN J. McINTYRE, OF HARTFORD, CONNECTICUT.

TOOL-HOLDER.

958,936.  Specification of Letters Patent.  Patented May 24, 1910.

Application filed March 31, 1909. Serial No. 486,885.

*To all whom it may concern:*

Be it known that I, JOHN J. McINTYRE, a citizen of the United States, residing at Hartford, in the county of Hartford and State of Connecticut, have invented a new and useful Improvement in Tool-Holders, of which the following is a specification.

This invention relates to those devices which are used with lathes, planers and analogous machine tools for holding the cutting instruments which are employed for cutting, turning and boring metal.

The object of the invention is to provide a device of this nature, which is very simple and cheap to construct, and by which a cutter can be firmly held close to its end, at any required angle with relation to the axis of the holder, by a clamp which has a vise-like grip, and which can be easily and quickly manipulated for loosening and clamping the cutter as desired.

Figure 1 of the accompanying drawings shows a plan of a holder that embodies the invention. Fig. 2 shows a side view of the same. Fig. 3 shows a central section of the body of the holder. Fig. 4 shows a side view of the clamp block; and Fig. 5 shows a side view of the holder with the clamp block reversed from the position shown in Fig. 2.

The body 1 of the tool, is preferably made of a rectangular bar of steel, although of course it could be made of other metal, and could have other cross sectional shape. This body is designed to be placed and secured in a dog, post, clamp or other holder, of a lathe, planer or the like machine. The body at the cutter end has a circular enlargement or head 2. Extending through this enlarged end, from top to bottom, is a cylindrical perforation 3, and drilled, milled, broached or otherwise cut obliquely into the cutter end of the body, that is, at an angle with the longitudinal axis of the body, is an opening 4. This opening is desirably made square in cross section, and of such size as to just receive the shank of the cutter 5, which may be made from steel of the proper character, and may be round, square, or other cross-sectional shape, depending upon the shape of the opening provided for it. The cutter end of the body is separated or split by a saw or milling cut 6 so that the ends will yield.

In the cylindrical perforation, in the cutter end of the body, is the clamp block 7. This clamp block has an elongated perforation 8, through which the cutter passes. At one end the clamp block has a head 9, which is larger in diameter than the opening through the body, and at the other end it has a threaded stud 10, upon which is placed a washer 11 and a nut 12. The clamp block may be rotated in the perforation through the body so that the cutter will extend at the desired angle with relation to the longitudinal axis of the body that is necessary to effect the required cut. The cutter may be inserted through the perforation in the clamp block so as to extend longitudinally with relation to the body of the holder, in which case the shank of the cutter will extend into the inclined opening in the body, as shown in full lines in Fig. 1. Or the cutter may be inserted through the clamp block so as to extend at any desired angle with relation to the longitudinal axis of the body, as shown by the dotted lines in Fig. 1. After the cutter has been located in the desired position, the nut on the end of the clamp block is screwed up. This causes the clamp block to draw together the two ends of the body and clamp the cutter firmly in position. The clamp block is placed in the body, as shown in Fig. 2, when it is designed to use the holder on a planer. For lathe work, the clamp block is placed in the body in the reverse direction, as shown in Fig. 5. When the cutter has been adjusted in and out the required distance, and set at the desired angle, the nut can be so tightened that the cutter will be held with a vise-like grip, relatively near the cutting point or edge. This holds the cutter firm and unyielding so that a clean and accurate cut may be made.

The invention claimed is:

1. A tool holder having a body with an opening for a cutter and a cylindrical opening for a clamp block, the longitudinal axis of said cutter opening being oblique with respect to the axis of the clamp block opening, a cylindrical clamp block with an opening for the cutter inserted in the cylindrical opening in the body, a cutter extending through the opening in the clamp block, and means for causing the clamp block to clamp the parts and bind the cutter in position.

2. A tool holder having a body with an opening for a cutter and a cylindrical opening for a clamp block, the longitudinal axis of said cutter opening being oblique with respect to the axis of the clamp block opening, a cylindrical clamp block with an opening for the cutter inserted in the cylindrical opening in the body, said clamp block having a head at one end and a threaded stud at the other, a cutter extending through the opening in the clamp block, and a nut screwed upon the threaded stud of the clamp block.

JOHN J. McINTYRE.

Witnesses:
HARRY R. WILLIAMS,
JOSEPHINE M. STREMPFER.